(12) United States Patent
Tomiyama et al.

(10) Patent No.: US 9,195,125 B2
(45) Date of Patent: Nov. 24, 2015

(54) PROJECTION DISPLAY APPARATUS AND PROJECTION LIGHT GENERATING METHOD

(71) Applicant: NEC Corporation, Minato-ku, Tokyo (JP)

(72) Inventors: Mizuho Tomiyama, Tokyo (JP); Naofumi Suzuki, Tokyo (JP); Masao Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/418,134

(22) PCT Filed: Jul. 30, 2013

(86) PCT No.: PCT/JP2013/004596
§ 371 (c)(1),
(2) Date: Jan. 29, 2015

(87) PCT Pub. No.: WO2014/020895
PCT Pub. Date: Feb. 6, 2014

(65) Prior Publication Data
US 2015/0160542 A1 Jun. 11, 2015

(30) Foreign Application Priority Data
Aug. 2, 2012 (JP) ................. 2012-172193

(51) Int. Cl.
*G03B 21/14* (2006.01)
*H04N 9/31* (2006.01)
*G03B 21/20* (2006.01)
*G02B 27/28* (2006.01)
*G03B 33/12* (2006.01)

(52) U.S. Cl.
CPC ............ *G03B 21/2073* (2013.01); *G02B 27/28* (2013.01); *G03B 21/2033* (2013.01); *G03B33/12* (2013.01); *H04N 9/3105* (2013.01); *H04N 9/3158* (2013.01); *H04N 9/3164* (2013.01); *H04N 9/3197* (2013.01)

(58) Field of Classification Search
CPC ..... H04N 9/31; H04N 9/3164; H04N 9/3167; H04N 9/3197; G02B 27/10; G02B 28/28; G02B 27/1006; G02B 27/141; G02B 27/145
USPC .......... 353/20, 31, 34, 37, 84, 94; 349/5, 7, 8, 349/9; 359/634; 362/231, 230
See application file for complete search history.

(56) References Cited

U.S. PATENT DOCUMENTS

| 5,648,870 | A | * | 7/1997 | Mistutake | ................ 359/487.05 |
| 6,628,346 | B1 | * | 9/2003 | Ebiko | ................ 349/9 |
| 7,413,310 | B2 | * | 8/2008 | Heine | ............. 353/31 |
| 7,621,642 | B2 | * | 11/2009 | Yamamoto | ............. 353/20 |
| 8,358,462 | B2 | * | 1/2013 | Jacobsen et al. | ............. 359/367 |
| 2014/0160364 | A1 | * | 6/2014 | Katou | ............. 349/5 |

FOREIGN PATENT DOCUMENTS

| JP | 2004-325477 A | 11/2004 |
| JP | 2005-321524 A | 11/2005 |
| JP | 2006-317739 A | 11/2006 |
| JP | 2007-065412 A | 3/2007 |
| WO | 2011/037014 A1 | 3/2011 |
| WO | 2012/086011 A1 | 6/2012 |
| WO | 2013/014794 A1 | 1/2013 |

OTHER PUBLICATIONS

International Search Report for PCT Application No. PCT/JP2013/004596, mailed on Oct. 22, 2013.

* cited by examiner

*Primary Examiner* — William C Dowling

(57) ABSTRACT

A first light source that emits first light of a first wavelength band; an optical path separator that separates the first light into third light and second light whose polarization directions are orthogonal to each other; an optical path separator and combiner that separates the second light into fourth light and fifth light having different wavelength bands from each other; a reflector that reflects the fifth light to a direction of the optical path separator and combiner; and an optical path combiner that combines the third light and the second light are included.

19 Claims, 12 Drawing Sheets

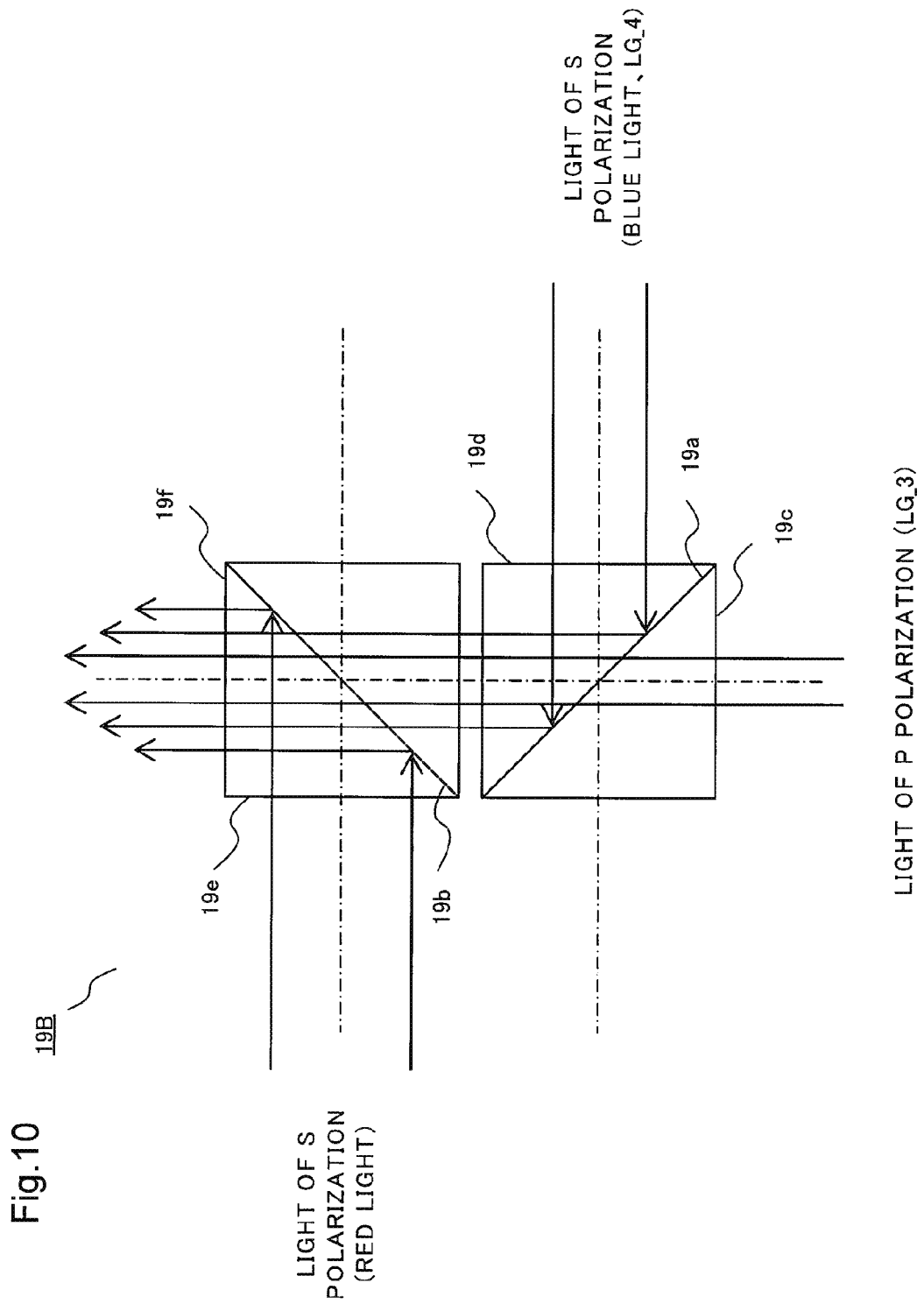

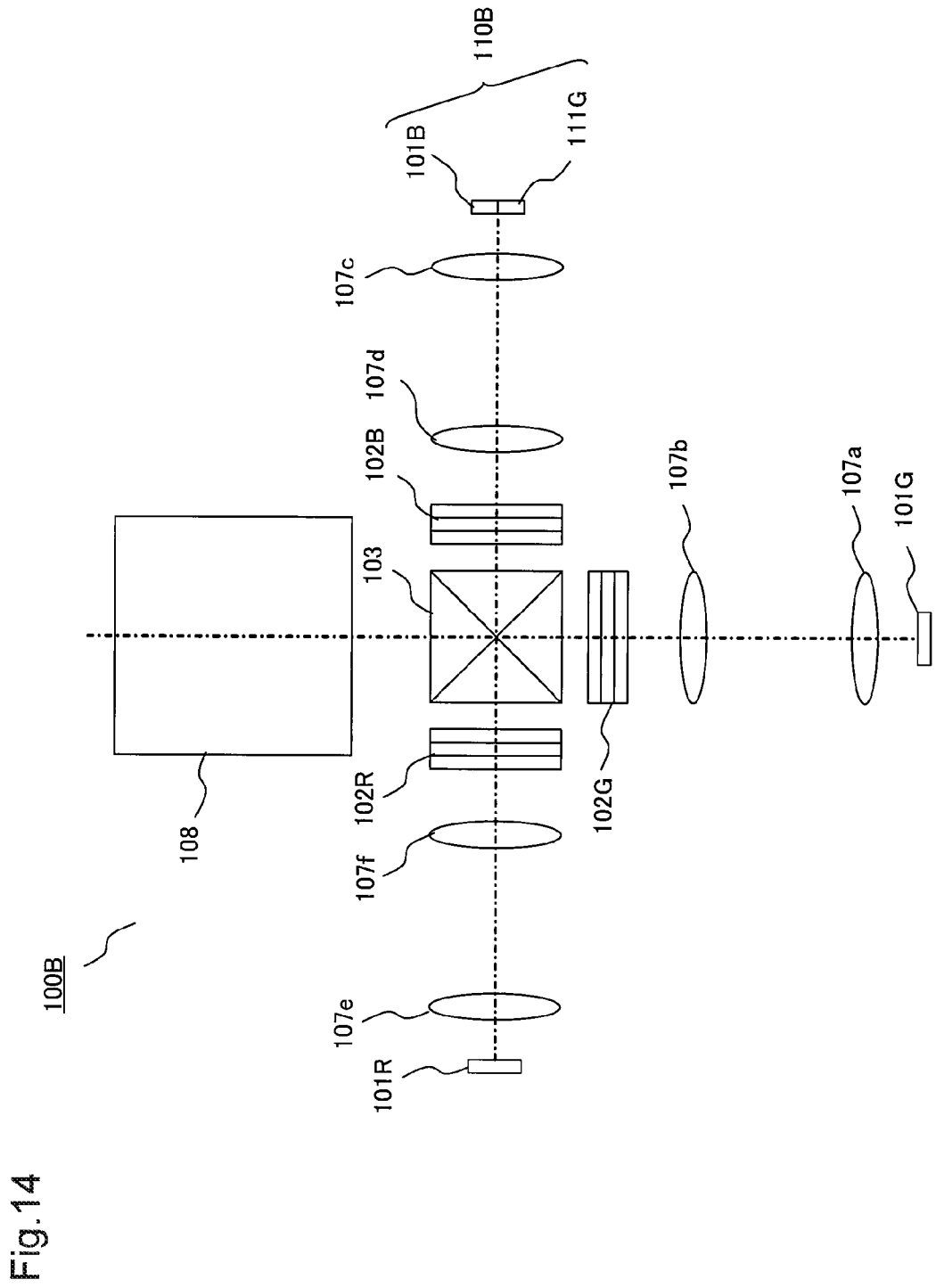

PROJECTION DISPLAY APPARATUS AND PROJECTION LIGHT GENERATING METHOD

This application is a National Stage Entry of PCT/JP2013/004596 filed on Jul. 30, 2013, which claims priority from Japanese Patent Application 2012-172193 filed on Aug. 2, 2012, the contents of all of which are incorporated herein by reference, in their entirety.

TECHNICAL FIELD

The present invention relates to a projection display apparatus and a projection light generating method.

BACKGROUND ART

Light sources having high brightness, low consumption power, and long life are desired in projection display apparatuses represented by projectors. Some exemplary light sources satisfying such requests are light emitting diodes (LED) and laser diodes (LD).

FIG. 13 is a block diagram of a projection display apparatus 100A which utilizes LED as a light source. Light rays from a green LED 101G, a blue LED 101B, and a red LED 101R are respectively transmitted through lenses 107a-107f, light modulators 102G, 102B, and 102R. Thereafter, respective light rays are combined by a cross dichroic prism 103, incident on a projection lens 108, and then projected onto a screen or the like (not illustrated in the drawing) from the projection lens 108.

Note that light modulators 102G, 102B, and 102R include polarizers, liquid crystal cells and analyzers, and spatially modulate and emit light incident thereon.

The cross dichroic prism 103 includes a dichroic film reflecting only light in a blue wavelength band, and a dichroic film reflecting only light in a red wavelength band. Then, the green light, the blue light, and the red light incident on the cross dichroic prism 103 from the three directions are combined, and projected onto the projection lens 108.

It is known that such an LED is made of a semiconductor, and can emit blue light by using an InGaN-based semiconductor material and red light by using an AlGaInP-based semiconductor material. However, an LED emitting green light formed by using InGaN-based and AlGaInP-based semiconductor materials suffers a problem of having low light emitting efficiency. This problem is called "green gap."

A light source combining LED or LD light sources with a phosphor light source has been proposed as a method to solve the lack in light quantity of green light related to this green gap. As an example of a light source using a phosphor, a configuration in which a blue LED and a phosphor are combined has been known (so-called "phosphor LED"). In this configuration, the blue light emitted from the blue LED is used as excitation light which helps the phosphor generate green light.

The blue LED used as an excitation light source has a larger output than the green LED does. Therefore, by using a phosphor LED, it is possible to obtain green light of higher brightness than that of green light emitted from a green LED.

On the other hand, Patent Literature 1 discloses a method to emit green light of high brightness using a plurality of green LEDs. FIG. 14 shows a configuration of the projection display apparatus 100B described in Patent Literature 1.

This projection display apparatus 100B includes a green LED 101G, a combined LED 110B, and a red LED 101R. Note that the combined LED 110B includes a blue LED 101B and a green LED 111G. The combined LED 110B emits light in which blue light and green light are combined.

Light rays respectively from LEDs are transmitted through lenses 107a-107f, light modulators 102G, 102B, and 102R, and incident on a cross dichroic prism 103.

The cross dichroic prism 103 has wavelength dependence and polarization dependence, and combines green light, blue light, and red light, as well as uses polarization to combine green light emitted from the green LED 101G and green light emitted from the green LED 111G of the combined LED 110B.

By emitting blue light and green light from the combined LED 110B, the intensity of green light emitted from the projection lens 108 can be increased.

Note that as a method to further increase the intensity of green light, it is possible to use a phosphor LED in the projection display apparatus of Patent Literature 1.

CITATION LIST

Patent Literature

PTL 1: WO 2011/037014 A1

SUMMARY OF INVENTION

Technical Problem

However, the spectral distribution of the green light source resulting when a phosphor LED is combined in the projection display apparatus of Patent Literature 1 will be wider than the spectral distribution for a green LED, and so overlaps with the spectral distributions of blue light and red light, which causes the following problem. That is, when the spectral distribution of the green light source overlaps with the spectral distribution of blue light or red light, the light rays in the wavelength bands whose spectrums are overlapped cannot be efficiently combined in the cross dichroic prism, which degrades the light utilization efficiency of the projection display apparatus.

In addition, because using a combined LED, the projection display apparatus of Patent Literature 1 suffers decreased intensity of blue light, despite the intensity improvement of green light.

In view of the above, an object of the present invention is to provide a projection display apparatus that uses a light source including a phosphor or the like having a wide spectral distribution as well as has improved light utilization efficiency by restraining intensity reduction of blue light and red light, and a projection light generating method.

Solution to Problem

So as to solve the above-mentioned problem, a projection display apparatus generating and projecting light of a plurality of wavelength bands is characterized by including: a first light source that emits first light of a first wavelength band; an optical path separator that separates the first light into third light and second light whose polarization directions are orthogonal to each other; an optical path separator and combiner that separates the second light into fourth light and fifth light having different wavelength bands from each other; a reflector that reflects the fifth light to a direction of the optical path separator and combiner; and an optical path combiner that combines the third light and the second light, where the fourth light is light of a fourth wavelength band being a predetermined band in the first wavelength band, and the fifth light is light of a fifth wavelength band other than the fourth wavelength band in the first wavelength band.

A projection light generating method generating and projecting light of a plurality of wavelength bands is characterized by including: emitting first light of a first wavelength band; separating the first light into third light and second light whose polarization directions are orthogonal to each other; separating the second light into fourth light and fifth light having different wavelength bands from each other; reflecting the fifth light to an incident direction; and combining the third light and the second light, where the fourth light is light of a fourth wavelength band being a predetermined band in the first wavelength band, and the fifth light is light of a fifth wavelength band other than the fourth wavelength band in the first wavelength band.

Advantageous Effects of Invention

The projection display apparatus according to the present invention combines a part of green light with blue light, thereby enabling to improve the intensity of green light without degrading the intensity of blue light, as well as enabling to improve the light utilization efficiency when combining green light with blue light or red light, even when a light source having a wide spectral distribution is used as a green light source.

BRIEF DESCRIPTION OF DRAWINGS

FIG. 10 is a top view of an optical path combiner.

FIG. 14 is another block diagram of a projection display apparatus used to explain a related art.

DESCRIPTION OF EMBODIMENTS

An exemplary embodiment of the present invention is described. Note that the projection display apparatus according to the present exemplary embodiment uses a green light source emitting green light, a blue light source emitting blue light, and a red light source emitting red light as detailed later. Please note that, although it is possible to associate the first light source, the second light source, and the third light source in the claims, with the green light source, the blue light source, and the red light source, respectively, the present invention is not limited to such correspondence relation. Therefore, the first light source may be associated with the red light source, for example. When the first light source is associated with the green light source, the first light is green light. When the first light source is associated with the red light source, the first light is red light. In addition, the wavelength band of the emitted light also depends on the color of the light source. The following explanation assumes that the first light source is a green light source, the second light source is a blue light source, and the third light source is a red light source.

Also in the following explanation, a specific polarization direction of light is assumed. However, the present invention is not limited to the specific polarization direction. In other words, although the following explanation assumes that light having a polarization component in the first direction is S polarization, and light having a polarization component in the second direction is P polarization, the present invention can also be applied to cases in which the S polarization and the P polarization are switched with each other.

Figure 1:
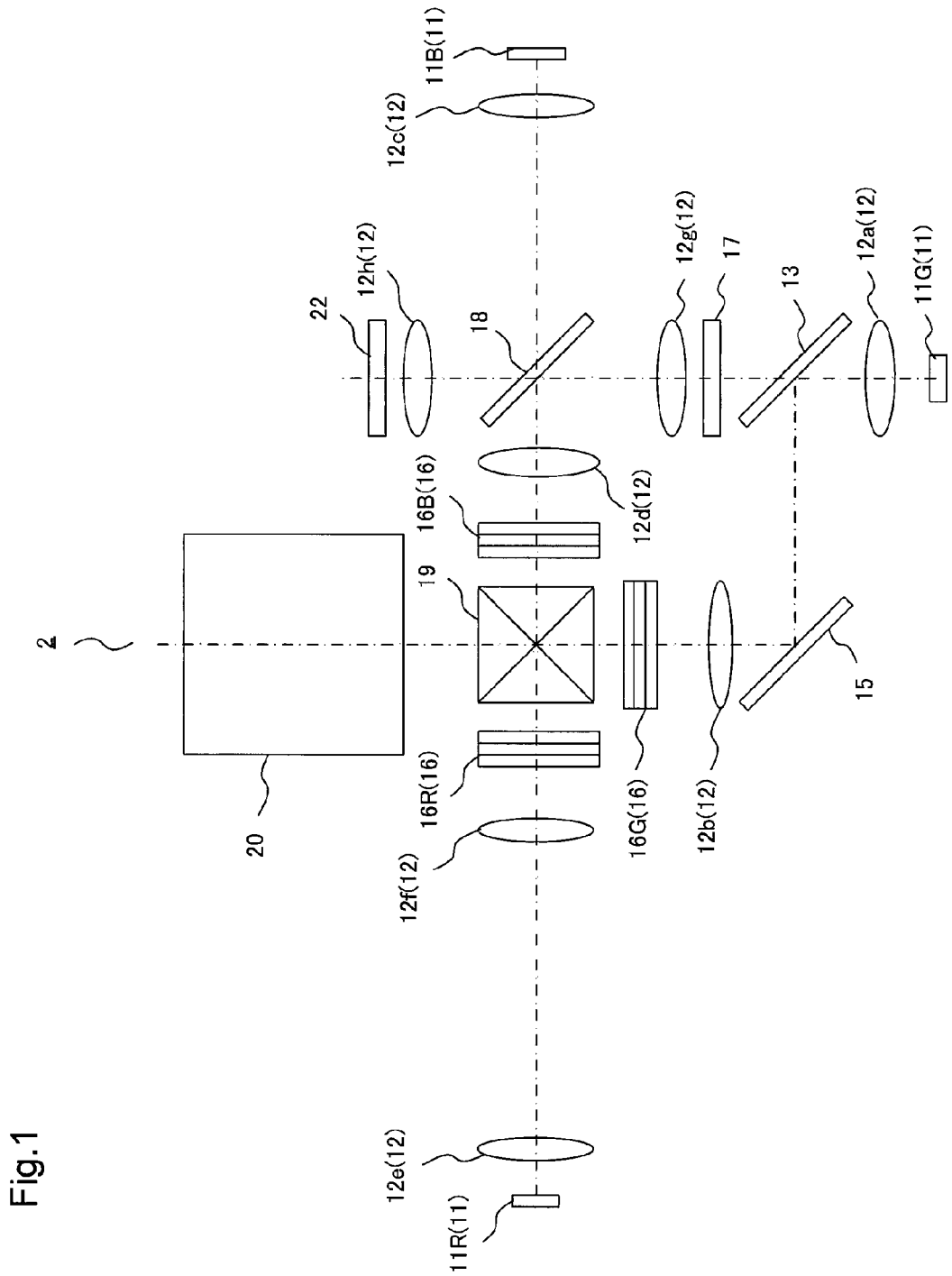
FIG. 1 is a block diagram of a projection display apparatus according to an exemplary embodiment of the present invention.
Figure 2:
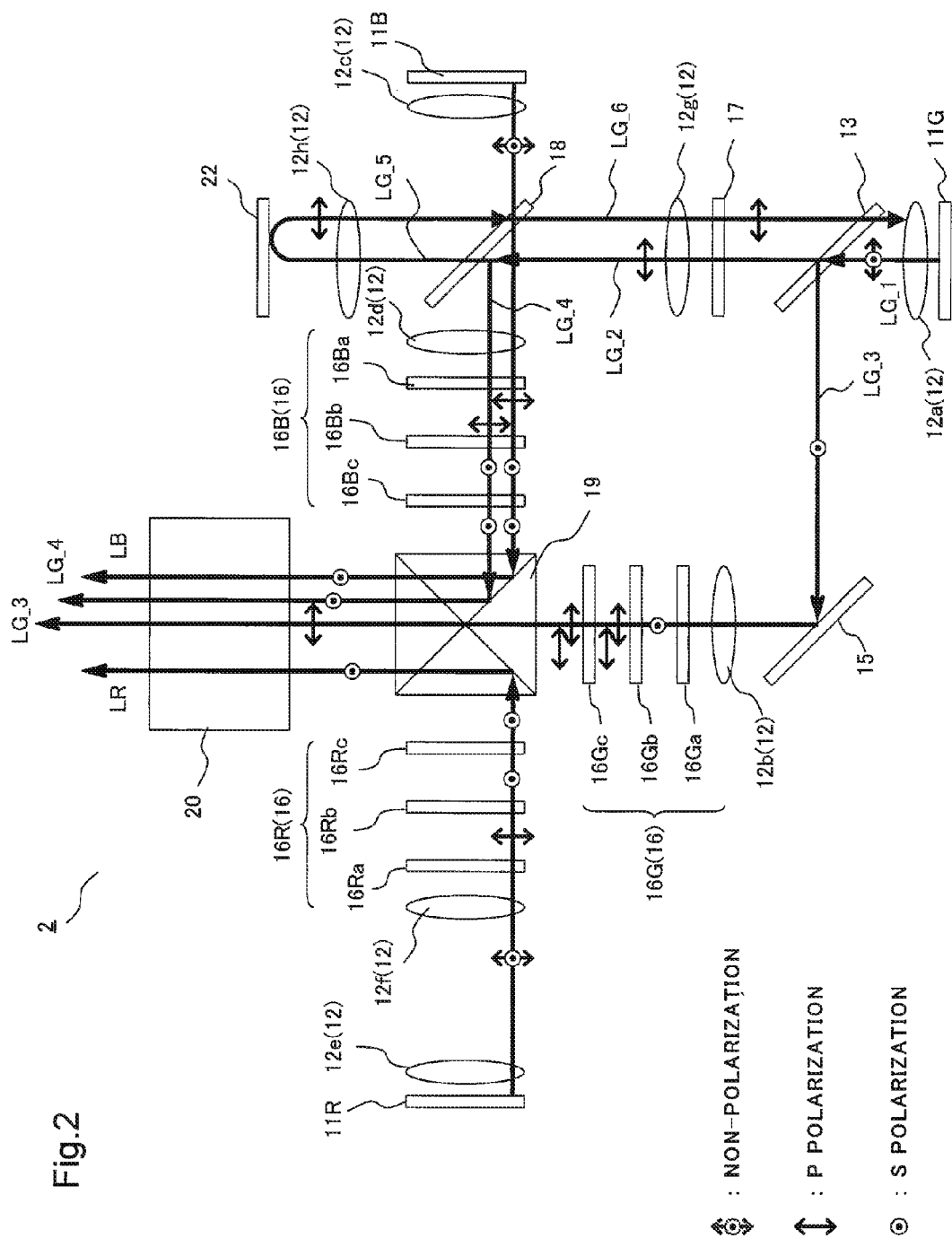
FIG. 2 is a block diagram of the block diagram of FIG. 1 to which a polarization state of light transmitted through an optical path or the like is added.

FIG. 1 is a block diagram of a projection display apparatus 2, and FIG. 2 is a block diagram in which the polarization state and propagation direction of light transmitted through an optical path are added to FIG. 1.

The projection display apparatus 2 includes a light source 11, a lens 12, an optical path separator 13, a mirror 15, a light modulator 16, a shutter (blocker) 17, an optical path separator and combiner 18, an optical path combiner 19, a projection lens 20, and a reflector 22.

The light source 11 includes a green light source (first light source) 11G emitting green light (first light), a blue light source (second light source) 11B emitting blue light (sixth light), and a red light source (third light source) 11R emitting red light (seventh light). As such a light source 11, a surface-light-emitting type solid state light source such as a light emitting diode or a surface-light-emitting laser, or a surface-light-emitting device made of a light source and a light guide plate can be adopted.

Note that a light source made up of at least an excitation light source and a phosphor can be used as the green light source 11G. As the excitation light source, LED or LD emitting light in any wavelength band from among the wavelength bands from violet to blue is used. As the phosphor, a phosphor material itself, a phosphor material dispersed in a transparent material, or a phosphor material stacked on a transparent material may be used. The excitation light source and the phosphor may be provided in close contact with each other, or with a gap therebetween. It is also possible to provide, in the gap, a lens, a light guide, others such as an optical element made of a transparent material, or a mirror. Also for the blue light source 11B and the red light source 11R, LED or LD is used, and may include such optical elements as a lens or a light guide as a constituting element. The following explanation assumes that the green light source 11G is a phosphor LED in which phosphors are densely packed, the blue light source 11B is a blue LED, and the red light source 11R is a red LED.

Figure 3:
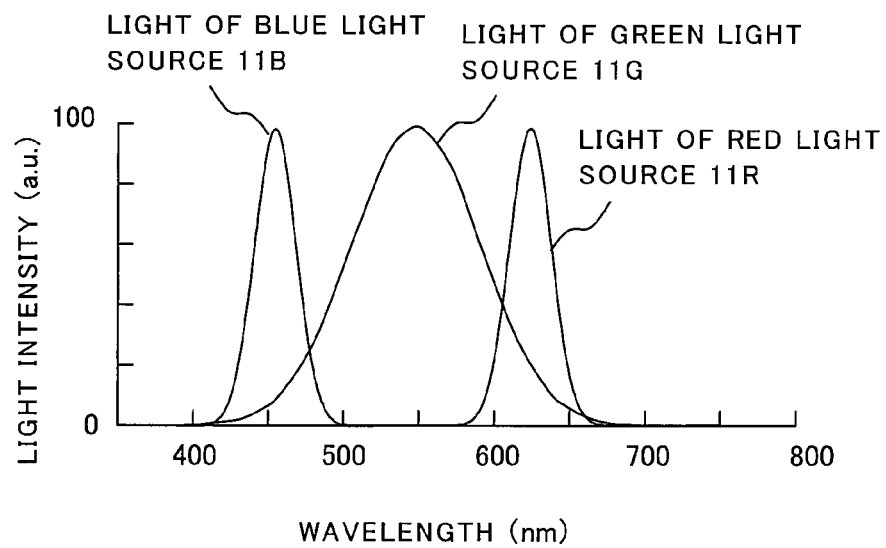
FIG. 3 is a spectral distribution diagram of light rays emitted from respective light sources.

FIG. 3 is a spectral distribution diagram of light rays emitted from respective light sources 11. The blue light emitted from the blue light source 11B has its peak in light intensity in the wavelength band of 400 nm-500 nm (second wavelength band). The green light emitted from the green light source 11G has its peak in light intensity in the wavelength band of 500 nm-600 nm (first wavelength band). The red light emitted from the red light source 11R has its peak in light intensity in the wavelength band of 600 nm-700 nm (third wavelength band). The spectral distribution of the green light emitted from the green light source 11G is partially overlapped with the spectrums of the emitted light rays from the blue light source 11B and the red light source 11R.

The lens 12 (12a-12h) either collects or diverges incident light and emits it.

The optical path separator 13 has a characteristic of transmitting P polarization of incident light and reflecting S polarization. The optical path separator 13 is formed by a polarizer. Note that for the optical path separator 13, a wire grid polarizer made of metal such as aluminum, silver, gold, or the like, a photonic crystal, a dielectric multilayer film, or the like may be used.

The mirror 15 reflects incident light.

The light modulator 16 includes a light modulator 16R, a light modulator 16G, a light modulator 16B, provided in correspondence with respective light sources 11 (11R, 11G, 11B), and spatially modulates incident light and emits it.

Figure 4:
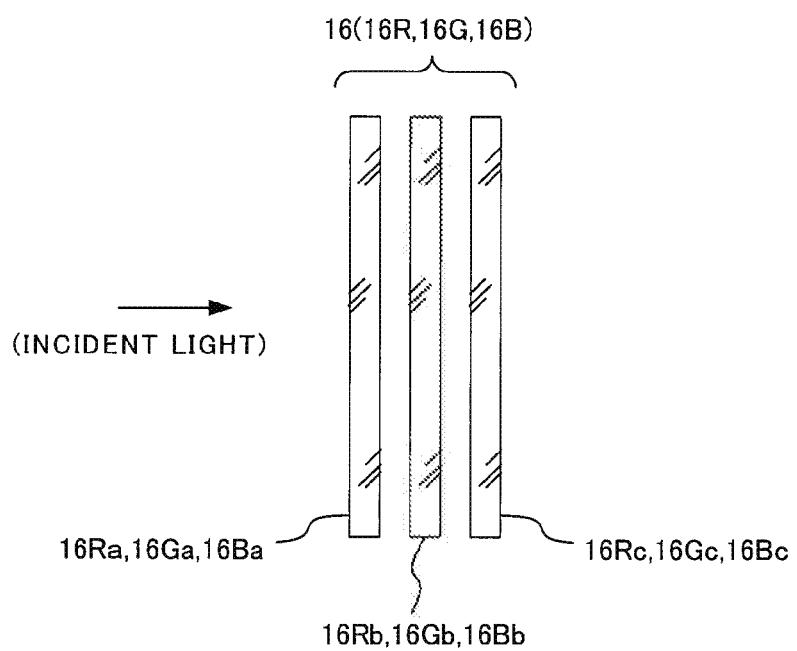
FIG. 4 is a block diagram of a light modulator.

FIG. 4 is a block diagram of the light modulator 16. The light modulators 16R, 16G, 16B are made up of polarizers 16Ra, 16Ga, 16Ba, liquid crystal cells 16Rb, 16Gb, 16Bb being polarization modulating elements, and analyzers 16Rc, 16Gc, 16Bc. Here, when the polarization component vertical to the paper is defined to be S polarization, and the polarization component parallel to the paper is defined to be P polarization, the polarizers 16Ba, 16Ra, and the analyzer 16Gc transmit only P polarization, and the polarizer 16Ga, and the analyzers 16Bc, 16Rc transmit only S polarization.

From among light incident from the polarizers 16Ra, 16Ga, 16Ba and whose polarization direction is rotated by being modulated by the liquid crystal cells 16Rb, 16Gb, 16Bb, the light of the polarization component that transmits through the analyzers 16Rc, 16Gc, 16Bc is emitted from the analyzers 16Rc, 16Gc 16Bc. Note that the polarization modulating element does not have to be a liquid crystal cell, and may be an element made of a material having an electro-optic effect such as PLZT (Lead Lanthanum Zirconate Titanate), SBN (Strontium Barium Niobate).

Note that a wire grid polarizer made of metal such as aluminum, silver, gold, or the like, a photonic crystal, a dielectric multilayer film, or the like may be used as the polarizers 16Ra, 16Ga, 16Ba, the analyzers 16Rc, 16Gc, 16Bc. In addition, an absorptive polarizer made of polymer may be used as the analyzers 16Rc, 16Gc, 16Bc.

The shutter 17 may have a configuration including an absorption plate and switching whether to transmit or absorb the incident light by taking in and out this absorption plate to the optical path. The shutter 17 may have a configuration of mechanically opening and closing the absorption plate.

Figure 5:
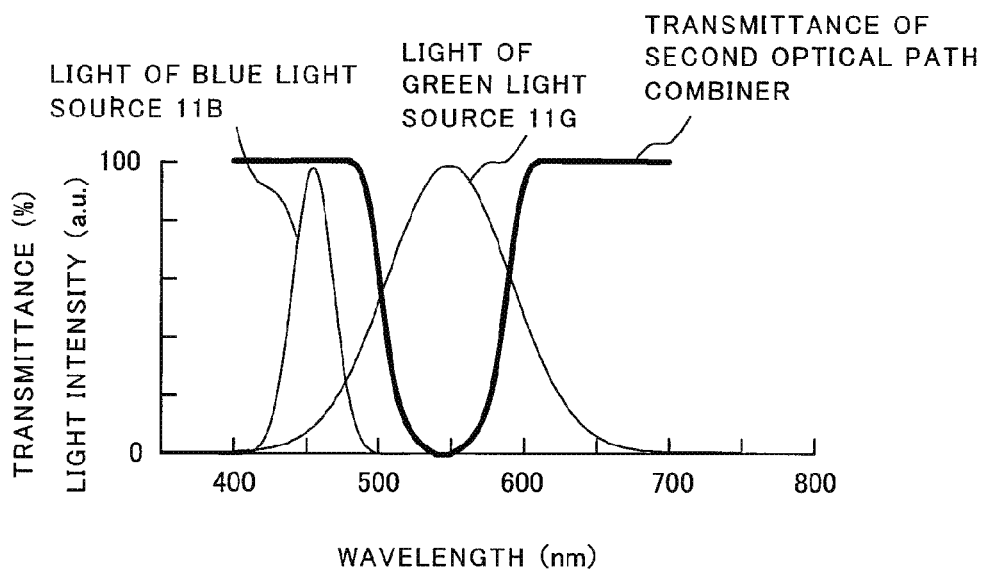
FIG. 5 shows wavelength dependence of the transmittance of an optical path separator and combiner and a spectral distribution diagram of each light source.

The optical separator and combiner 18 either combines incident two light rays having different wavelength bands, or separates incident light into two light rays having different wavelength bands. FIG. 5 shows wavelength dependence of the transmittance of an optical path separator and combiner 18 and a spectral distribution diagram of each light source. The optical separator and combiner 18 has such a characteristic as reflecting light of a wavelength in the vicinity of 550 nm, and transmitting light of the other wavelengths. The wavelength band to be reflected is set to be narrower than the wavelength band of emitted light from of the green light source 11G.

Note that when the spectral distribution of the green light source 11G is narrow, the optical path separator and combiner 18 does not have to reflect only the light of the wavelength in the vicinity of 550 nm. In other words, when the wavelength band in which the spectral distribution of light from the green light source 11G and the spectral distribution of light from the red light source overlap is narrow, the optical path separator and combiner 18 may be set to also reflect light of the wavelength band in the wavelength side longer than 550 nm.

The reflector 22 reflects off the light having been transmitted through the optical path separator and combiner 18. The light reflected at the reflector 22 is incident on the optical path separator and combiner 18 again.

Figure 6:
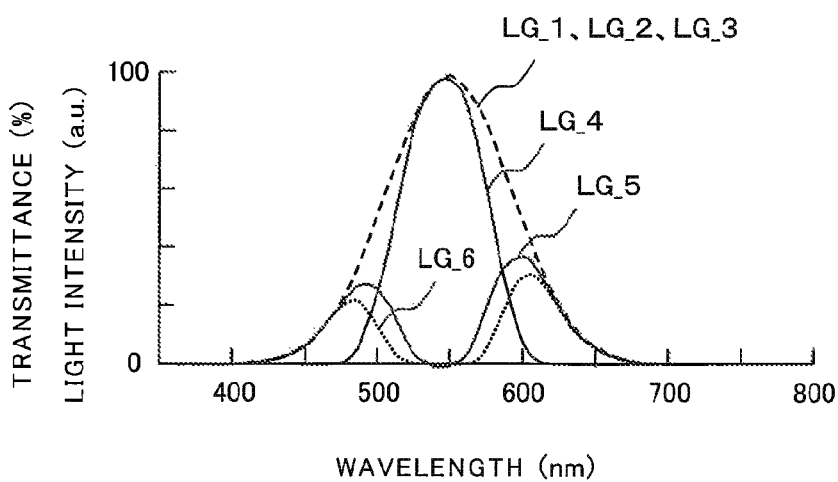
FIG. 6 is a spectral distribution diagram of incident light and emitted light of the optical path separator.

FIG. 6 is a diagram showing a spectral distribution of light LG_1 to LG_6.

The light LG_1 (first light) is light emitted from the green light source 11G.

The light LG_2 (second light) is light of P polarization transmitted through the optical path separator 13, of the light LG_1.

The light LG_3 (third light) is light of S polarization reflected at the optical path separator 13, of the light LG_1.

The light LG_4 (fourth light) is light reflected at the optical path separator and combiner 18, of the light LG_2.

The light LG_5 (fifth light) is light transmitted through the optical path separator and combiner 18, of the light LG_2.

The light LG_6 is light reflected at the reflector 22 and transmitted through the optical path separator and combiner 18, of the light LG_5.

As illustrated in FIG. 6, the light rays LG_1, LG_2, LG_3 have the same spectral distribution. On the other hand, the light LG_4 has a wavelength band narrower than that of the light LG_2 as well as has a peak in the vicinity of the wavelength of 550 nm, due to the reflection characteristic of the optical path separator and combiner 18.

Furthermore, the light LG_5 and the light LG_6 has such a spectral distribution as having reduced light intensity in the wavelength band in the vicinity of the wavelength of 550 nm due to the transmission characteristic of the optical path separator and combiner 18, and having peaks in the shorter wavelength side and the longer wavelength side than this wavelength band. Note that the light intensity and the wavelength band of the light LG_6 are narrower than those of the light LG_5 because of transmitting the optical path separator and combiner 18 twice.

The optical path combiner 19 combines light rays incident from a plurality of directions, and emits them to the projection lens 20. A cross dichroic prism may be used as the optical path combiner 19.

Figure 7:
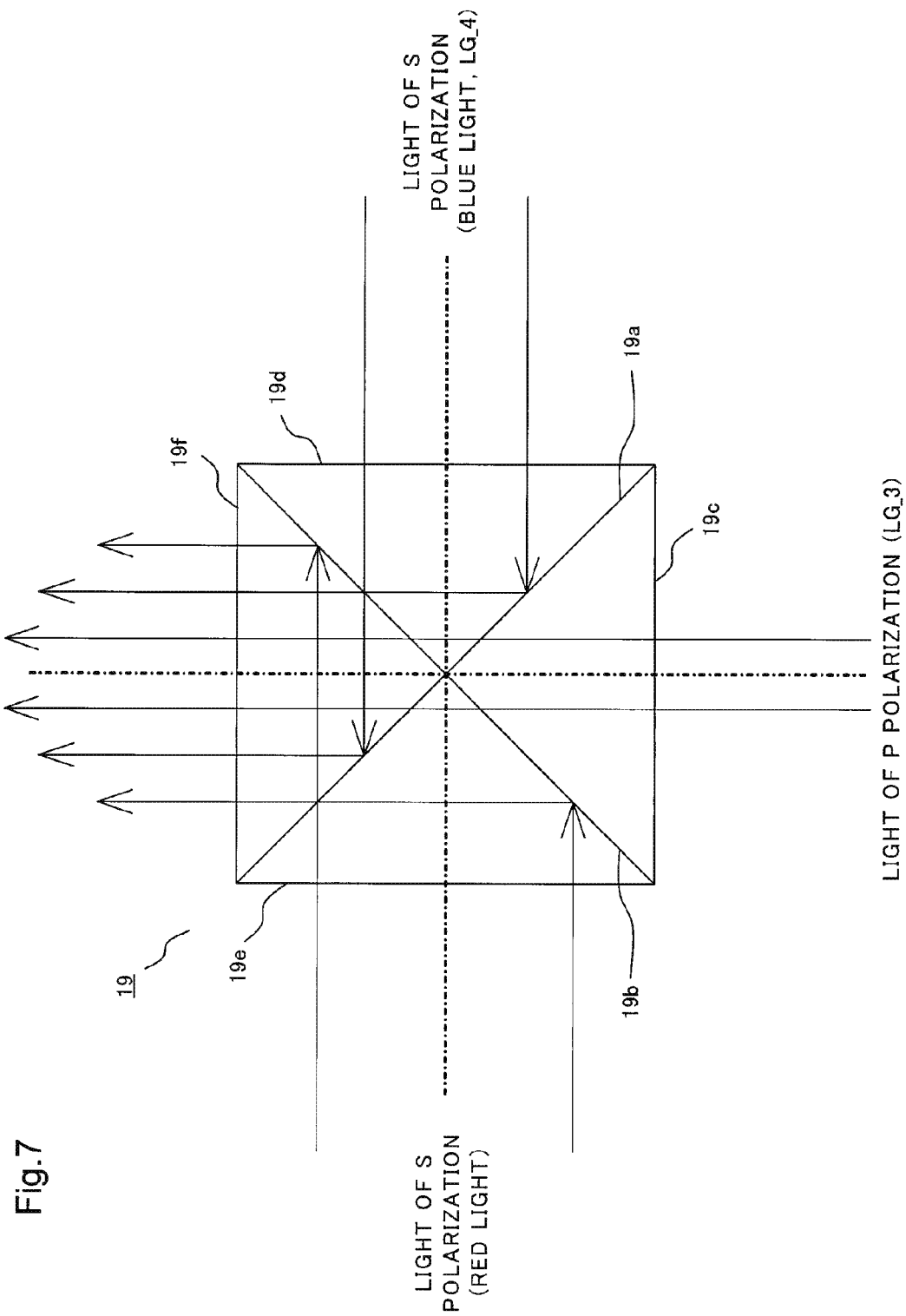
FIG. 7 is a top view of an optical path combiner.

FIG. 7 is a top view of an optical path combiner 19. The optical path combiner 19 includes a first dichroic film 19a and a second dichroic film 19b provided to be orthogonal. The optical path combiner 19 combines the light LG_3 incident from the first incident surface 19c, the blue light, the light LG_4 incident from the second incident surface 19d, and the red light incident from the third incident surface 19e, and emits them from the emission surface 19f.

Figure 8A:
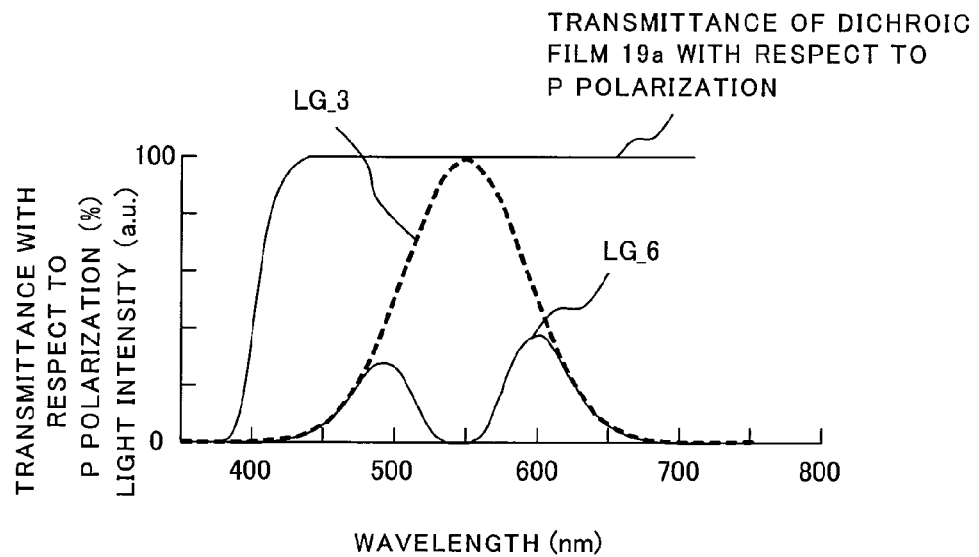
FIG. 8 shows wavelength dependence of the transmittance of a first dichroic film and the spectral distribution of light incident on the optical path combiner.
Figure 8B:
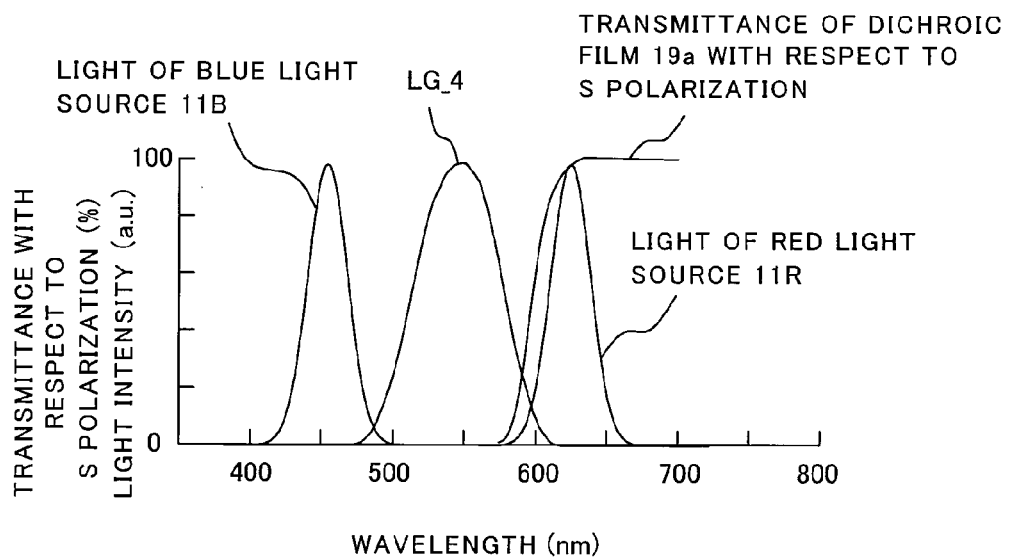
Figure 9A:
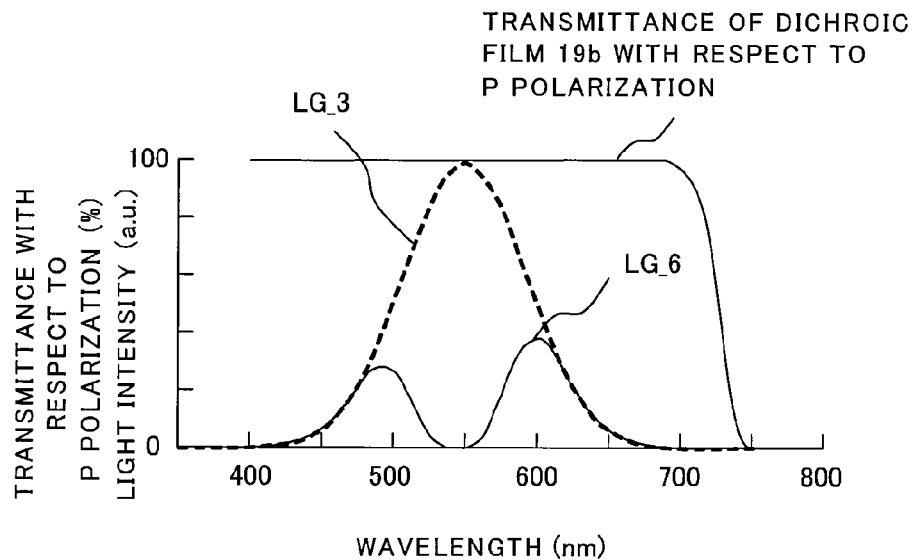
FIG. 9 shows wavelength dependence of the transmittance of a second dichroic film the spectral distribution of light incident on the optical path combiner.
Figure 9B:
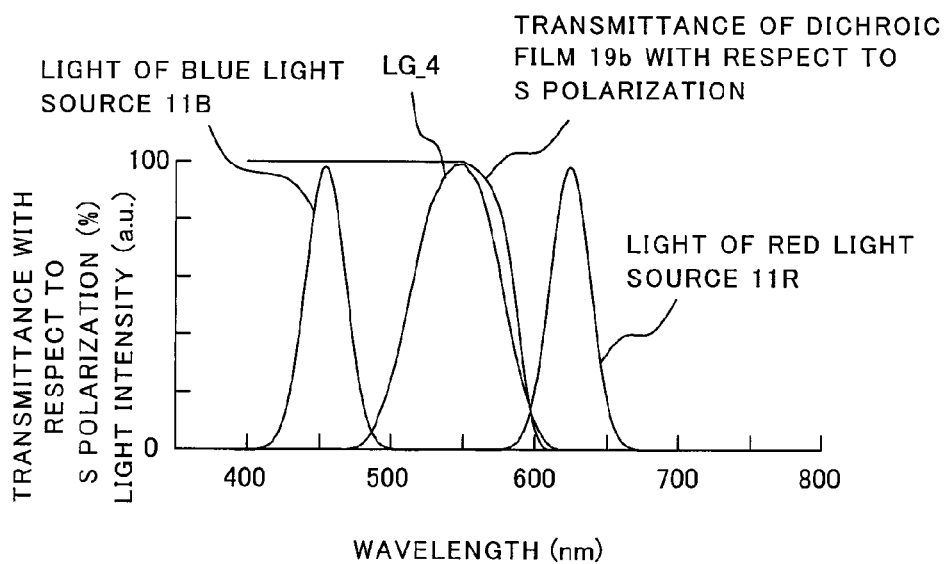

FIG. 8 shows wavelength dependence of the transmittance of a first dichroic film 19a and a spectral distribution of light incident on the optical path combiner 19, and FIG. 9 shows wavelength dependence of the transmittance of a second dichroic film 19b and a spectral distribution of light incident on the optical path combiner 19. FIG. 8A and FIG. 9A show a characteristic with respect to light of P polarization (light having polarization component in the second direction), and FIG. 8B and FIG. 9B show a characteristic with respect to light of S polarization (light having polarization component in the first direction).

As illustrated in FIG. 7, on the optical path combiner 19, the light LG_3 of P polarization component (polarization component in the second direction), the light LG_4 and the blue light of S polarization component (polarization component in the first direction), and the red light of S polarization component (polarization component in the first direction) are incident.

The first dichroic film 19a transmits the light LG_3 of P polarization, and also transmits the red light of S polarization. Furthermore, the first dichroic film 19a reflects the light LG_4 and the blue light of S polarization.

On the other hand, the second dichroic film 19b transmits the light LG_3 of P polarization, and also transmits the light LG_4 and the blue light of S polarization, and reflects the red light of S polarization.

Therefore as illustrated in FIG. 7, the light LG_3 of P polarization is transmitted through the first dichroic film 19a and the second dichroic film 19b and emitted towards the projection lens 20. In addition, the blue light and the light LG_4 of S polarization are reflected at the first dichroic film 19a, and the red light of S polarization is reflected at the second dichroic film 19b, and each of them is emitted towards the projection lens 20. Accordingly, the optical path combiner 19 can combine and emit incident rays of light almost without any loss.

Note that, as the optical path separator and combiner 18, the first dichroic film 19a, and the second dichroic film 19b having been described above, elements which use a dielectric multilayer film, a holographic element, a photonic crystal, or the like, and which have a characteristic of transmitting light of a specific wavelength band and reflecting light of the other wavelength bands can be used. Note that the dichroic film 19a and the dichroic film 19b are not necessarily arranged to be orthogonal to each other, and may intersect with each other with an angle other than 90 degrees. Moreover, the dichroic film 19a and the dichroic film 19b do not necessarily intersect with each other. In other words, a configuration may be provided by two prisms, one having a dichroic film 19a and another having a dichroic film 19b, as the prism 19B illustrated in FIG. 10.

The projection lens 20 projects the emitted light from the optical path combiner 19 onto a screen not illustrated in the drawings.

Figure 11:
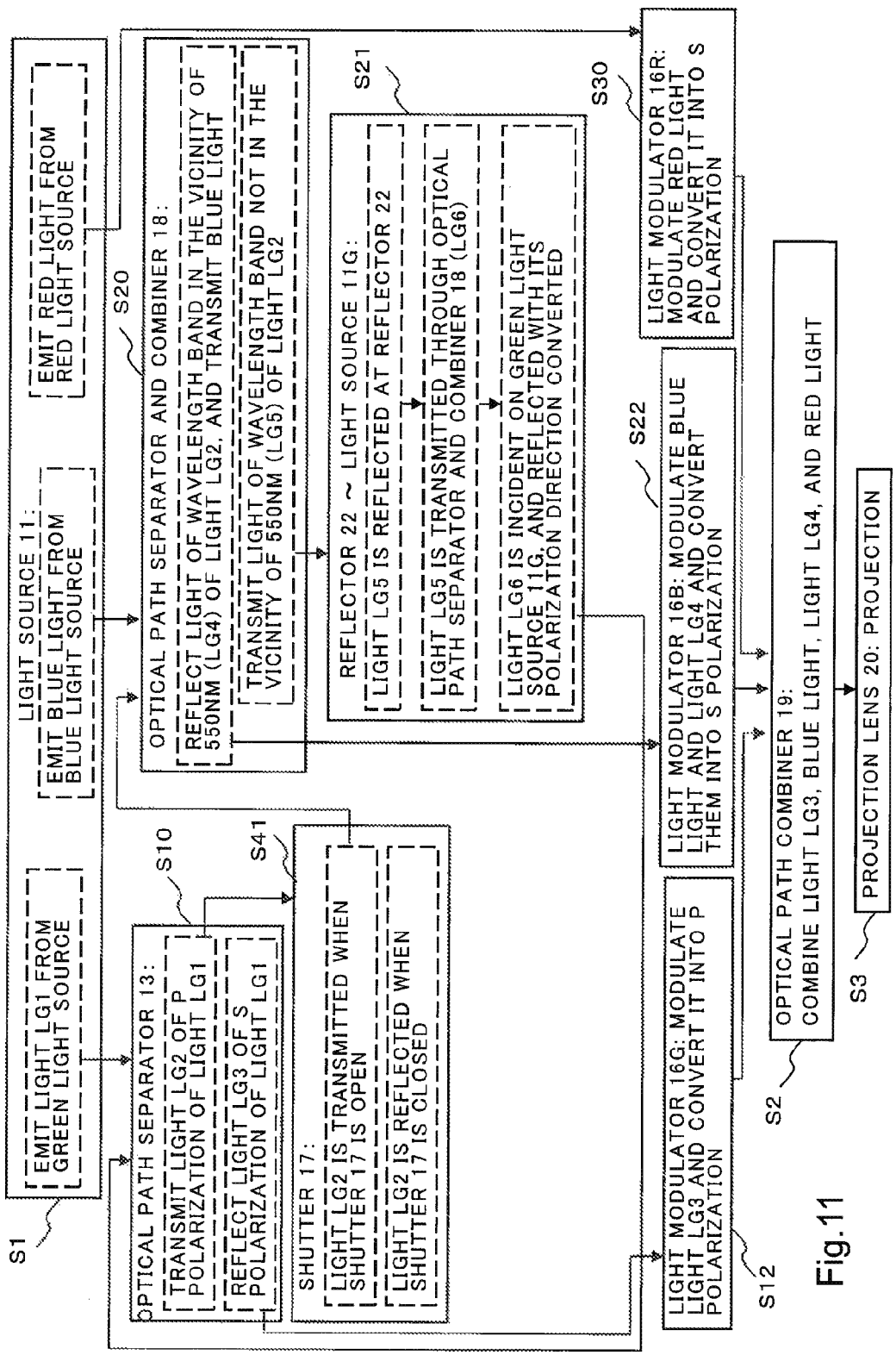
FIG. 11 is a flow chart showing a light separating and combining step.

Next, the optical path of light from each light source 11 is explained below. FIG. 11 is a flow chart showing a light separating and combining step. Step S1 is a step of emitting light from each light source 11. Step S10, Step S40, Step S12 are steps in which the light emitted from the green light source 11G transmits through the optical path separator 13, the shutter 17, and the light modulator 16G respectively. Step S20 is a step in which the light LG_4 transmitted through the blue light source 11B and the shutter 17 passes through the optical path separator and combiner 18. Step S21 is a step in which the light LG_5 transmitted through the optical path separator and combiner 18 is transmitted through the reflector 22, the optical path separator and combiner 18, and the green light source 11G. Step S22 is a step in which the light transmitted through the optical path separator and combiner 18 is transmitted through the light modulator 16B. Step S30 is a step in which the light emitted from the red light source 11R is transmitted through the light modulator 16R. Step S2 is a step in which the light transmitted through the light modulator 16 is incident on the light path combiner 19, combined there, and emitted therefrom. Step S3 is a step of projecting the light incident on the projection lens 20 onto a screen.

Step S1: Light rays are respectively emitted from the red light source 11R, the green light source 11G, and the blue light source 11B.

Step S10: The light LG_1 emitted from the green light source 11G transmits through the lens 12a, and is incident on the optical path separator 13. Then, the P polarization component of the light LG_1 is transmitted though the optical path separator 13, and its S polarization component is reflected at the optical path separator 13. That is, the light LG_1 is separated into two, i.e., into the transmitted light LG_2 and the reflected light LG_3 depending on the polarization direction. During this process, the light LG_2 of P polarization component having transmitted through the optical path separator 13 is incident on the shutter 17, and the light LG_3 of S polarization component having been reflected at the optical path separator 13 is incident on the mirror 15.

Step S12: The light LG_3 of S polarization incident on the mirror 15, and then reflected to be incident on the light modulator 16G is spatially modulated in the light modulator 16G as well as converted into light of P polarization, and is incident on the first incident surface 19c of the optical path combiner 19.

Step S40: When the shutter 17 is set to transmit the incident light (when the shutter 17 is open), the light LG_2 having transmitted through the optical path separator 13 in Step S10 is transmitted through the shutter 17, and is incident on the optical path separation combiner 18. On the other hand, when the shutter 17 is set to absorb the incident light (when the shutter 17 is closed), the light LG_2 having transmitted through the optical path separator 13 in Step S10 is absorbed by the shutter 17.

Step S20: When the shutter 17 is open, the light LG_4 and the light emitted from the blue light source 11B are incident on the optical path separator and combiner 18. As illustrated in FIG. 5, the optical path separator and combiner 18 has such a characteristic as reflecting light of a wavelength in the vicinity of 550 nm, and transmitting light of the other wavelengths. Therefore, the blue light from the blue light source 11B transmits through the optical path separator and combiner 18. In addition, of the light LG_2, the light LG_4 of the wavelength band range in the vicinity of 550 nm is reflected at the optical path separator and combiner 18, and the light LG_5 in the other wavelength band is transmitted through the optical path separator and combiner 18. On the other hand, when the shutter 17 is closed, only the blue light is incident on the optical path combiner 18, and transmitted through the optical path combiner 18.

Step S21: The light LG_5 of the wavelength band not in the vicinity of 550 nm having transmitted through the optical path separator and combiner 18 is transmitted through the lens 12h, reflected at the reflector 22, and transmitted through the lens 12h again, and is incident on the optical path separator and combiner 18.

The light LG_5 reflected at the reflector 22 is transmitted though the optical path separator and combiner 18, and this transmitted light LG_6 is transmitted through the optical path separator 13 and incident on the green light source 11G. The light LG_6 incident on the green light source 11G is reflected at the green light source 11G with its polarization direction randomly converted. That is, the light LG_6 behaves as if it is the light emitted from the green light source 11G, and returns from Step S20 to Step S10. Consequently, the green light transmitted through the optical path separator 13 can be effectively utilized. Accordingly, the light LG_4 of green light and blue light are combined in the optical path separator and combiner 18, and incident on the light modulator 16B.

Step S22: The light LG_4, the blue light in P polarization incident on the light modulator 16B are spatially modulated as well as converted in light of S polarization in the light modulator 16B, and incident on the second incident surface 19d of the optical path combiner 19.

Step S30: The red light incident on the light modulator 16R is spatially modulated as well as converted in light of S polarization in the light modulator 16R, and incident on the third incident surface 19e of the optical path combiner 19.

As explained above, the light LG_3 of P polarization is incident on the first incident surface 19c of the optical path combiner 19, the blue light and the light LG_4 of S polarization are incident on the second incident surface 19d, and the red light of S polarization is incident on the incident surface 19e.

Step S2: The optical path combiner 19 combines the light incident on the optical path combiner 19, and emits it from the emission surface 19f to the projection lens 20.

Step S3: The light emitted from the optical path combiner 19 is projected onto a screen by means of the projection lens 20.

When the shutter 17 is open, the light incident on the optical path combiner 19 after transmitting through the light modulator 16B is light resulting from combining the light LG_4 having a peak in intensity in wavelengths between 500 nm and 600 nm and the blue light having a peak in intensity in wavelengths between 400 nm and 500 nm. Due to this, the resulting light will be closer to white light than the blue light is on the chromaticity coordinate, and the color reproduction range of the emitted light from the projection display apparatus 2 will be narrow.

As opposed to this, when the shutter 17 is closed, the light incident on the optical path combiner 19 after transmitting through the light modulator 16B is only blue light. Therefore, the chromaticity range of the emitted light from the projection display apparatus 2 will be wide than when the shutter 17 is open.

In other words, by opening and closing the shutter 17, it is possible to switch between narrowing the color reproduction range by increasing the output of the projection display apparatus 2 and widening the color reproduction range by decreasing the output.

Figure 12:
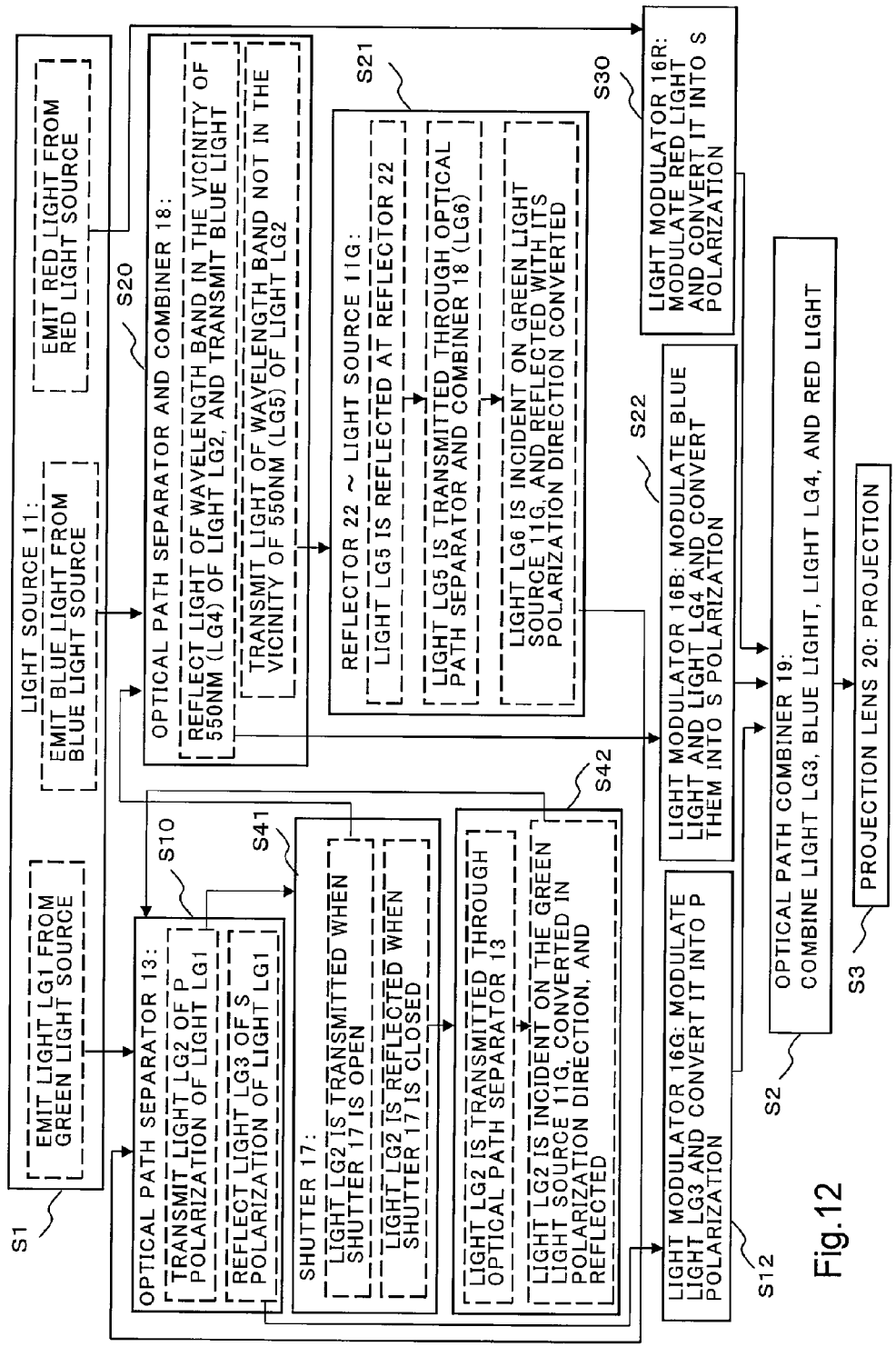
FIG. 12 is a flow chart showing a light separating and combining step.
Figure 13:
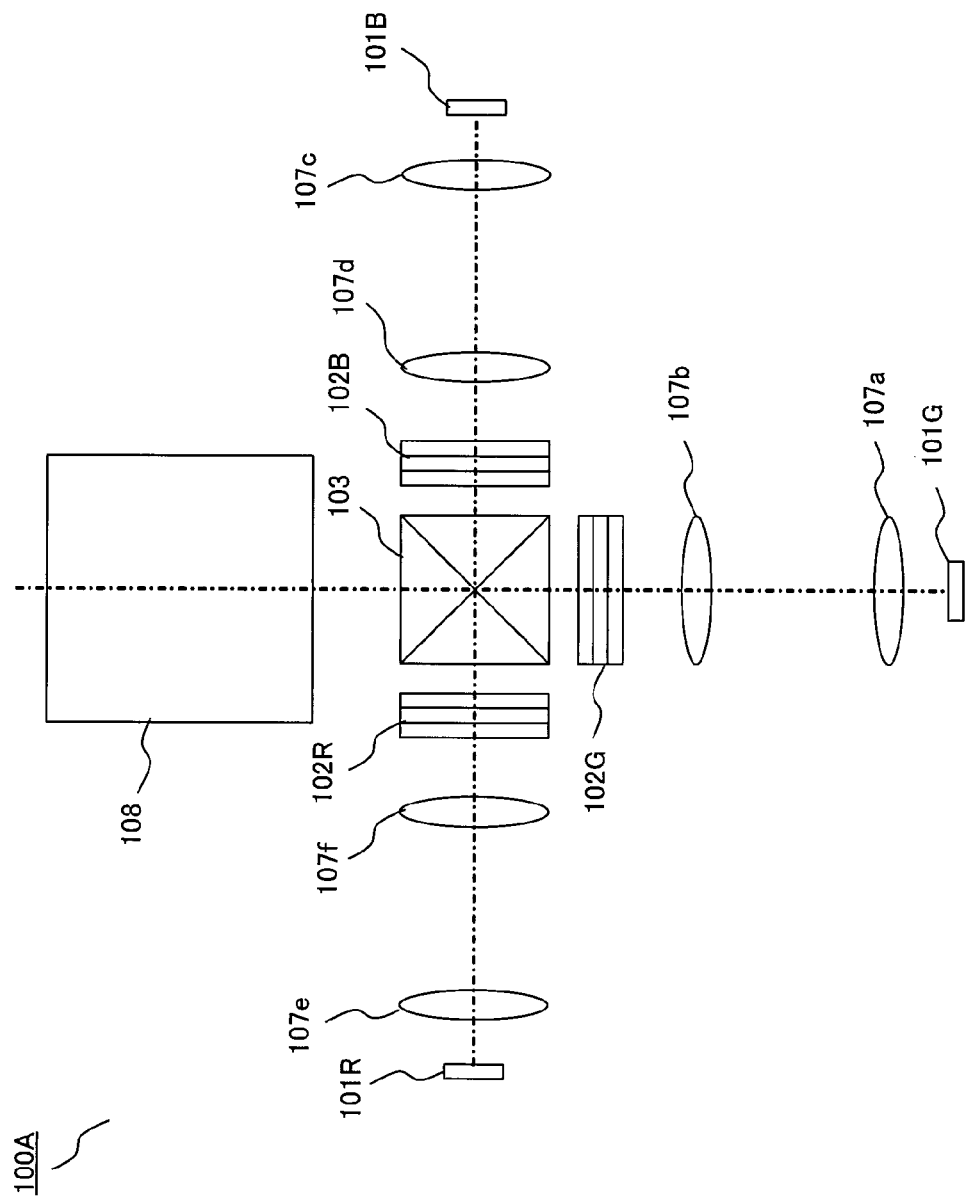
FIG. 13 is a block diagram of a projection display apparatus used to explain a related art.

Note that it is also possible to adopt a configuration in which the mirror instead of the absorption plate is taken in and out as the shutter 17, to switch between whether to transmit or reflect the incident light. FIG. 12 shows a flowchart explaining a transmission state of light transmitted through each element such as an optical path separator 13, a light modulator 16, or the like, when the mirror is used as the shutter 17. The flow chart of FIG. 12 is the same as the flowchart illustrated in FIG. 11, except including Step S41 instead of Step S40 of the flow chart of FIG. 11 and including Step S42.

Step S41: If the configuration is such as switching whether to transmit or reflect incident light by the shutter 17 taking in and out the mirror on the optical path, and the shutter 17 is designed to transmit the incident light (when the shutter 17 is open), the light LG_2 having transmitted through the optical path separator 13 in Step S10 is transmitted through the shutter 17, and is incident on the optical path separation combiner 18. On the other hand, when the shutter 17 is set to reflect the incident light (when the shutter 17 is closed), the light LG_2 having transmitted through the optical path separator 13 in Step S10 is reflected at the shutter 17 and incident on the optical path separator 13.

Step S42: The light LG_2 having been reflected at the shutter 17 and incident on the optical path separator 13 is transmitted through the optical path separator 13, and incident on the green light source 11G. The light LG_2 incident on the green light source 11G is reflected at the green light source 11G with its polarization direction randomly converted. In other words, the light LG_2 behaves as if it is light emitted from the green light source 11G, and returns from Step S42 to Step S10.

By using a mirror as the shutter 17 in this manner, the light quantity of the light incident on the optical path combiner 19 after transmitting through the light modulator 16G can be increased compared to the case in which an absorption plate is used.

In addition, a half mirror may be used as the mirror of the shutter 17. By using a half mirror, it is possible to arbitrarily set the relation between the color reproduction range and the light output.

As explained above, the light LG_3 of S polarization having been separated in optical path in the optical path separator 13 can be made incident on the projection lens 20 without losing its light quantity in the optical path combiner 19. In addition, when the shutter 17 is open, of the light LG_2 of P polarization, the light LG_4 of the wavelength band in the vicinity of the wavelength of 550 nm can be made incident on the projection lens 20 without losing its light quantity in the optical path combiner 19. Moreover, of the light LG_2 of P polarization, the light LG_5 of the wavelength band not in the vicinity of the wavelength of 550 nm will be repeatedly reflected while changing its polarization state between the reflector 22 and the green light source 11G, and eventually be reflected at the optical path separator 13 as S polarization, thereby being able to be incident on the projection lens 20.

Therefore, by separating the light emitted from the single green light source 11G into two, and mixing one light ray with blue light, the light quantity of the green light can be increased without degrading the intensity of the red light and the blue light.

Here, when blue light and green light LG_2 are mixed and combined in the optical path separator and combiner 18, of the light LG_2, the light whose wavelength band is overlapped with the wavelength band of the blue light will not be mixed. However, the light LG_5 left unmixed in the optical path separator and combiner 18 is reflected at the reflector 22, is incident on the green light source 11G, and is emitted from the green light source 11G again by being randomly converted in polarization direction. Part of this light LG_6 emitted from the green light source 11G again will be transmitted through the light modulator 16G and incident on the optical path combiner 19 together with the light LG_3. In this manner, those of green light whose wavelength band is overlapped with the wavelength band of blue light can also be efficiently utilized.

Note that although only the lens 12a is provided between the green light source 11G and the optical path separator 13 in the above-explained configuration, a ¼ wave plate may be provided therebetween.

A ¼ wave plate has a function of giving a phase difference of 90 degrees to the transmitted light. Therefore, of the light LG_6 of P polarization reflected at the reflector 22 and transmitted through the optical path separator and combiner 18, the light specular reflected at the green light source 11G without randomly converted in polarization direction after transmitting through the optical path separator 13 is transmitted through this ¼ wave plate twice and given 180 degrees of phase difference while being incident on the optical path separator 13 again, thereby being converted in light of S polarization. By doing so, the number of times of reflection of the light LG_6 at the reflector 22 and the green light source 11G can be reduced, as well as restraining the absorption loss in the optical path separator 13 and the green light source 11G, and the surface reflection during passage through the optical path separator and combiner 18, the lens 12a, the lens 12g, and the lens 12h, and the light quantity loss due to vignetting.

The present application claims the priority of Japanese Patent Application No. 2012-172193 filed on Aug. 2, 2012, the disclosure of which is incorporated herein in its entirety.

Part or all of the above-described exemplary embodiments can also be described as follows, however should not be limited to as below.

Supplementary Note 1

A projection display apparatus generating and projecting light of a plurality of wavelength bands, including:
a first light source that emits first light of a first wavelength band;
an optical path separator that separates the first light into third light and second light whose polarization directions are orthogonal to each other;
an optical path separator and combiner that separates the second light into fourth light and fifth light having different wavelength bands from each other;
a reflector that reflects the fifth light to a direction of the optical path separator and combiner; and
an optical path combiner that combines the third light and the second light, where
the fourth light is light of a fourth wavelength band being a predetermined band in the first wavelength band, and
the fifth light is light of a fifth wavelength band other than the fourth wavelength band in the first wavelength band.

Supplementary Note 2

The projection display apparatus according to Supplementary Note 1, including:
a second light source that emits sixth light having a second wavelength band; and
a third light source that emits seventh light having a third wavelength band, where
the optical path separator and combiner combines the sixth light with the fourth light, and
the optical path combiner combines the sixth light, the seventh light, the third light, and the fourth light.

Supplementary Note 3

The projection display apparatus according to Supplementary Note 2, where
the optical path combiner includes:
a first incident surface on which the third light is incident;
a second incident surface on which the sixth light and the fourth light are incident;
a third incident surface on which the seventh light is incident; and
an emission surface on which the incident third light through seventh light are combined and emitted therefrom.

Supplementary Note 4

The projection display apparatus according to Supplementary Note 3, where
the optical path combiner includes:
a first film that, at least out of light of the second wavelength band or light of the fourth wavelength band, reflects light having a polarization component in a first direction, and at least out of light of the first wavelength band, transmits light having a polarization component in a second direction orthogonal to the first direction; and
a second film that, at least out of light of the third wavelength band, reflects light having the polarization component in the first direction, and at least out of light of the first wavelength band, transmits light having the polarization component in the second direction.

Supplementary Note 5

The projection display apparatus according to Supplementary Note 3 or 4, including:
a first light modulator to a third light modulator that correspond to the first incident surface to the third incident surface of the optical path combiner respectively, and modulate light incident on the respective incident surfaces, where
the first light modulator to the third light modulator are formed by arranging a polarizer, a polarization modulating element, and an analyzer from the side of incident light.

Supplementary Note 6

The projection display apparatus according to any one of Supplementary Notes 1 to 5, including:
a ¼ wave plate that is provided between the optical path separator and the first light source.

Supplementary Note 7

The projection display apparatus according to any one of Supplementary Notes 2 to 5, where
the first light has a peak in intensity in wavelengths between 500 nm and 600 nm,
the sixth light has a peak in intensity in wavelengths between 400 nm and 500 nm, and
the seventh light has a peak in intensity in wavelengths between 600 nm and 700 nm.

Supplementary Note 8

The projection display apparatus according to any one of Supplementary Notes 1 to 7, where
the first light source includes:
a fourth light source that emits eighth light having a peak in light intensity in wavelengths between 300 nm and 500 nm; and
a phosphor that absorbs light from the fourth light source and emits the first light.

Supplementary Note 9

The projection display apparatus according to any one of Supplementary Notes 1 to 8, including:
a first blocker that switches whether to transmit or block incident light, between the optical path separator and the optical path separator and combiner.

Supplementary Note 10

The projection display apparatus according to any one of Supplementary Notes 1 to 8, including:
a second blocker that switches whether to transmit or reflect incident light, between the optical path separator and the optical path separator and combiner.

Supplementary Note 11

The projection display apparatus according to any one of Supplementary Notes 1 to 8, including:

a third blocker that switches whether to transmit incident light, or to transmit a part of the incident light and reflect a part of the incident light, between the optical path separator and the optical path separator and combiner.

Supplementary Note 12

A projection light generating method generating and projecting light of a plurality of wavelength bands, including:
a first light emitting means of emitting first light of a first wavelength band;
a first optical path separating procedure of separating the first light into third light and second light whose polarization directions are orthogonal to each other;
an optical path separating and combining procedure of separating the second light into fourth light and fifth light having different wavelength bands from each other;
a reflecting procedure of reflecting the fifth light to a direction of the optical path separating and combining procedure; and
an optical path combining procedure of combining the third light and the second light, where
the fourth light is light of a fourth wavelength band being a predetermined band in the first wavelength band, and
the fifth light is light of a fifth wavelength band other than the fourth wavelength band in the first wavelength band.

Supplementary Note 13

The projection light generating method according to Supplementary Note 12, including:
a sixth light emitting means of emitting sixth light having a second wavelength band; and
a seventh light emitting means of emitting seventh light having a third wavelength band, where
the optical path separating and combining procedure combines the sixth light with the fourth light, and
the optical path combining procedure combines the sixth light, the seventh light, the third light, and the fourth light.

Supplementary Note 14

The projection light generating method according to Supplementary Note 13, where
the optical path combining procedure includes:
a first incident surface on which the third light is incident;
a second incident surface on which the sixth light and the fourth light are incident;
a third incident surface on which the seventh light is incident; and
an emission surface on which the incident third light through seventh light are combined and emitted therefrom.

Supplementary Note 15

The projection light generating method according to Supplementary Note 14, where
the optical path combining procedure includes:
a first film that, at least out of light of the second wavelength band or light of the fourth wavelength band, reflects light having a polarization component in a first direction, and at least out of light of the first wavelength band, transmits light having a polarization component in a second direction orthogonal to the first direction; and
a second film that, at least out of light of the third wavelength band, reflects light having the polarization component in the first direction, and at least out of light of the first wavelength band, transmits light having the polarization component in the second direction.

Supplementary Note 16

The projection light generating method according to any one of Supplementary Notes 12 to 15, where
the first light emitting means includes:
an eighth light emitting means of emitting eighth light a peak in light intensity in wavelengths between 300 nm and 500 nm; and
a fluorescence emitting means of absorbing light from the eighth light emitting means and emits the first light.

Supplementary Note 17

The projection light generating method according to any one of Supplementary Notes 12 to 16, including:
a first blocking procedure of switching whether to transmit or block the second light separated in the optical path separating procedure.

Supplementary Note 18

The projection light generating method according to any one of Supplementary Notes 12 to 16, including:
a second blocking procedure of switching whether to transmit or reflect the second light separated in the optical path separating procedure.

Supplementary Note 19

The projection light generating method according to any one of Supplementary Notes 12 to 16, including:
a third blocking procedure of switching whether to transmit the second light, or to transmit a part of the second light and reflect a part of the second light separated in the optical path separating procedure.

REFERENCE SIGNS LIST 2 projection display apparatus
11 light source
11G green light source
11B blue light source
11R red light source
12(12a-12h) lens
13 optical path separator
15 mirror
16Ra, 16Ga, 16Ba polarizer
16Rb, 16Gb, 16Bb liquid crystal cell
16Rc, 16Gc, 16Bc analyzer
16(16R, 16G, 16B) light modulator
17 shutter
18 optical path separator and combiner
19 optical path combiner
19a first dichroic film
19b second dichroic film
19c first incident surface
19d second incident surface
19e third incident surface
19f emission surface
20 projection lens
22 reflector

What is claimed is:
1. A projection display apparatus generating and projecting light of a plurality of wavelength bands, comprising:

a first light source that emits first light of a first wavelength band;

an optical path separator that separates the first light into third light and second light whose polarization directions are orthogonal to each other;

an optical path separator and combiner that separates the second light into fourth light and fifth light having different wavelength bands from each other;

a reflector that reflects the fifth light to a direction of the optical path separator and combiner; and an optical path combiner that combines the third light and the second light, wherein the fourth light is light of a fourth wavelength band being a predetermined band in the first wavelength band, and the fifth light is light of a fifth wavelength band other than the fourth wavelength band in the first wavelength band.

2. The projection display apparatus according to claim 1, further comprising:

a second light source that emits sixth light having a second wavelength band; and a third light source that emits seventh light having a third wavelength band, wherein the optical path separator and combiner combines the sixth light with the fourth light, and the optical path combiner combines the sixth light, the seventh light, the third light, and the fourth light.

3. The projection display apparatus according to claim 2, wherein the optical path combiner includes:

a first incident surface on which the third light is incident;

a second incident surface on which the sixth light and the fourth light are incident;

a third incident surface on which the seventh light is incident; and an emission surface on which the incident third light through seventh light are combined and emitted therefrom.

4. The projection display apparatus according to claim 3, wherein the optical path combiner includes:

a first film that, at least out of light of the second wavelength band or light of the fourth wavelength band, reflects light having a polarization component in a first direction, and at least out of light of the first wavelength band, transmits light having a polarization component in a second direction orthogonal to the first direction; and a second film that, at least out of light of the third wavelength band, reflects light having the polarization component in the first direction, and at least out of light of the first wavelength band, transmits light having the polarization component in the second direction.

5. The projection display apparatus according to claim 4, further comprising:

a first light modulator to a third light modulator that correspond to the first incident surface to the third incident surface of the optical path combiner respectively, and modulate light incident on the respective incident surfaces, wherein the first light modulator to the third light modulator are formed by arranging a polarizer, a polarization modulating element, and an analyzer from the side of incident light.

6. The projection display apparatus according to claim 5, further comprising:

a ¼ wavelength plate that is provided between the optical path separator and the first light source.

7. The projection display apparatus according to claim 5, wherein the first light has a peak in intensity in wavelengths between 500 nm and 600 nm, the sixth light has a peak in intensity in wavelengths between 400 nm and 500 nm, and the seventh light has a peak in intensity in wavelengths between 600 nm and 700 nm.

8. The projection display apparatus according to claim 7, wherein the first light source includes:

a fourth light source that emits eighth light having a peak in light intensity in wavelengths between 300 nm and 500 nm; and a phosphor that absorbs light from the fourth light source and emits the first light.

9. The projection display apparatus according to claim 8, further comprising:

a first blocker that switches whether to transmit or block incident light, between the optical path separator and the optical path separator and combiner.

10. The projection display apparatus according to claim 8, further comprising:

a second blocker that switches whether to transmit or reflect incident light, between the optical path separator and the optical path separator and combiner.

11. The projection display apparatus according to claim 8, further comprising:

a third blocker that switches whether to transmit incident light, or to transmit a part of the incident light and reflect a part of the incident light, between the optical path separator and the optical path separator and combiner.

12. A projection light generating method generating and projecting light of a plurality of wavelength bands, comprising:

emitting first light of a first wavelength band;

separating the first light into third light and second light whose polarization directions are orthogonal to each other;

separating the second light into fourth light and fifth light having different wavelength bands from each other;

reflecting the fifth light to an incident direction; and combining the third light and the second light, wherein the fourth light is light of a fourth wavelength band being a predetermined band in the first wavelength band, and the fifth light is light of a fifth wavelength band other than the fourth wavelength band in the first wavelength band.

13. The projection light generating method according to claim 12, further comprising:

emitting sixth light having a second wavelength band;

emitting seventh light having a third wavelength band;

combining the sixth light with the fourth light; and combining the sixth light, the seventh light, the third light, and the fourth light.

14. The projection light generating method according to claim 13, further comprising:

causing the third light to be incident on a first incident surface;

causing the sixth light and the fourth light to be incident on a second incident surface;

causing the seventh light to be incident on a third incident surface; and combining and emitting the third light through the seventh light having been incident on an emission surface.

15. The projection light generating method according to claim 14, further comprising:

by a first film, at least out of light of the second wavelength band or light of the fourth wavelength band, reflecting light having a polarization component in a first direction, and at least out of light of the first wavelength band, transmitting light having a polarization component in a second direction orthogonal to the first direction; and by a second film, at least out of light of the third wavelength band, reflecting light having the polarization component in the first direction, and at least out of light of the first wavelength band, transmitting light having the polarization component in the second direction.

16. The projection light generating method according to claim 15, further comprising:

emitting eighth light a peak in light intensity in wavelengths between 300 nm and 500 nm; and absorbing the eighth light and emits the first light.

17. The projection light generating method according to claim 16, further comprising:

switching whether to transmit or block the second light.

18. The projection light generating method according to claim 16, further comprising:

switching whether to transmit or reflect the second light.

19. The projection light generating method according to claim 16, further comprising:

switching whether to transmit the second light, or to transmit a part of the second light and reflect a part of the second light.

* * * * *